US009715714B2

(12) United States Patent
Koch et al.

(10) Patent No.: US 9,715,714 B2
(45) Date of Patent: Jul. 25, 2017

(54) CONTENT CREATION AND LICENSING CONTROL

(71) Applicant: Adobe Systems Incorporated, San Jose, CA (US)

(72) Inventors: Zeke Koch, San Francisco, CA (US); Baldo Faieta, San Francisco, CA (US); Jen-Chan Chien, Saratoga, CA (US); Mark M. Randall, Folsom, CA (US); Olivier Sirven, Paris (FR); Philipp Koch, Park City, UT (US); Dennis G. Nicholson, Atherton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 135 days.

(21) Appl. No.: 14/827,974

(22) Filed: Aug. 17, 2015

(65) Prior Publication Data

US 2017/0053372 A1 Feb. 23, 2017

(51) Int. Cl.
*G06T 1/00* (2006.01)
*G06F 3/048* (2013.01)
*G06F 21/16* (2013.01)
*G06F 21/10* (2013.01)

(52) U.S. Cl.
CPC ............ *G06T 1/0021* (2013.01); *G06F 3/048* (2013.01); *G06F 21/10* (2013.01); *G06F 21/16* (2013.01); *G06T 2201/005* (2013.01)

(58) Field of Classification Search
CPC . G06T 1/0021; G06T 11/00; G06T 2201/005; G06Q 2220/18; G06F 3/048; G06F 17/30002; G06F 17/3005; G06F 17/30058; G06F 17/3028; G06F 17/60; G06F 21/10; G06F 21/105; G06F 21/16
See application file for complete search history.

(56) References Cited

U.S. PATENT DOCUMENTS

| 5,696,964 A | 12/1997 | Cox et al. ..................... 395/605 |
| 6,012,073 A | 1/2000 | Arend et al. .................. 707/526 |
| 6,157,435 A | 12/2000 | Slater et al. ................... 355/40 |
| 6,483,570 B1 | 11/2002 | Slater et al. ................... 355/40 |

(Continued)

OTHER PUBLICATIONS

"First Action Interview Office Action", U.S. Appl. No. 14/827,836, Mar. 22, 2017, 4 pages.

(Continued)

*Primary Examiner* — Andrew W Johns
(74) *Attorney, Agent, or Firm* — Wolfe-SBMC

(57) ABSTRACT

Content creation and licensing control techniques are described. In a first example, a content creation service is configured to support content creation using an image along with functionality to locate the image or a similar image that is available for licensing. In another example, previews of images are used to generate different versions of content along with an option to license images previewed in an approved version of the content. In a further example, fingerprints are used to locate images used as part of content creation by a content creation service without leaving a context of the service. In yet another example, location of licensable versions of images is based at least in part on identification of a watermark included as part of an image. In an additional example, an image itself is used as a basis to locate other images available for licensing by a content sharing service.

20 Claims, 16 Drawing Sheets

(56) References Cited

U.S. PATENT DOCUMENTS

| | | |
|---|---|---|
| 6,574,616 B1 | 6/2003 | Saghir .............................. 707/1 |
| 6,859,802 B1 | 2/2005 | Rui .................. 707/5 |
| 6,873,327 B1 | 3/2005 | Edwards et al. ............. 345/473 |
| 6,901,378 B1 | 5/2005 | Linker et al. .................... 705/27 |
| 6,941,294 B2 | 9/2005 | Flank .............................. 707/3 |
| 7,047,413 B2 | 5/2006 | Yacobi et al. ................. 713/176 |
| 7,113,921 B2 | 9/2006 | Linker et al. .................... 705/27 |
| 7,127,106 B1 | 10/2006 | Neil et al. .................... 382/181 |
| 7,249,034 B2 | 7/2007 | Schirmer et al. .................. 705/1 |
| 7,286,723 B2 | 10/2007 | Taugher et al. .............. 382/305 |
| 7,460,737 B2 | 12/2008 | Shuster ......................... 382/305 |
| 7,492,921 B2 | 2/2009 | Foote ............................ 382/100 |
| 7,493,340 B2 | 2/2009 | Rui ............................ 707/104.1 |
| 7,523,102 B2 | 4/2009 | Bjarnestam et al. ............. 707/3 |
| 7,574,378 B2 | 8/2009 | Lipowitz et al. ............... 705/26 |
| 7,613,686 B2 | 11/2009 | Rui ................. 707/3 |
| 7,689,620 B2 | 3/2010 | Tan .............................. 707/741 |
| 7,725,398 B2 | 5/2010 | Dawson et al. ................ 705/54 |
| 7,783,624 B2 | 8/2010 | Martinez et al. ............. 707/709 |
| 7,797,377 B2 | 9/2010 | Linker et al. ................. 709/203 |
| 7,808,555 B2 | 10/2010 | Aratani et al. ............... 348/578 |
| 7,818,261 B2 | 10/2010 | Weiskoph et al. ............... 705/59 |
| 7,920,760 B2 | 4/2011 | Yoda ............................ 382/305 |
| 7,929,810 B2 | 4/2011 | Shuster ......................... 382/305 |
| 7,933,765 B2 | 4/2011 | Summerlin et al. ............. 704/8 |
| 7,940,959 B2 | 5/2011 | Rubenstein ................... 382/103 |
| 7,949,625 B2 | 5/2011 | Brough et al. ................. 706/47 |
| 7,961,938 B1 | 6/2011 | Remedios ..................... 382/162 |
| 7,996,266 B2 | 8/2011 | Gura ............................. 705/26 |
| 8,041,612 B1 | 10/2011 | Treyz et al. ................. 705/27.1 |
| 8,073,828 B2 | 12/2011 | Bowden et al. ............. 707/705 |
| 8,144,995 B2 | 3/2012 | Thompson ................... 382/128 |
| 8,155,382 B2 | 4/2012 | Rubenstein ................... 382/103 |
| 8,219,494 B1 | 7/2012 | Pride et al. ..................... 705/54 |
| 8,229,800 B2 | 7/2012 | Trotman et al. ............. 705/27.2 |
| 8,285,082 B2 | 10/2012 | Heck ............................. 382/305 |
| 8,285,084 B2 | 10/2012 | Yoda ............................ 382/305 |
| 8,341,195 B1 | 12/2012 | Cole et al. .................... 707/805 |
| 8,380,005 B1 | 2/2013 | Jonsson ........................ 382/282 |
| 8,396,331 B2 | 3/2013 | Jia et al. ....................... 382/305 |
| 8,412,568 B2 | 4/2013 | Bastos et al. ................. 705/14.1 |
| 8,452,049 B2 | 5/2013 | Rubenstein ................... 382/103 |
| 8,504,547 B1 | 8/2013 | Yee et al. ..................... 707/706 |
| 8,515,139 B1 | 8/2013 | Nechyba et al. ............. 382/118 |
| 8,560,455 B1 | 10/2013 | Raman et al. .................. 705/59 |
| 8,571,329 B2 | 10/2013 | Thompson ................... 382/128 |
| 8,582,872 B1 | 11/2013 | Ioffe et al. .................... 382/159 |
| 8,620,905 B2 | 12/2013 | Ellsworth et al. .. G06F 7/30038 |
| 8,625,887 B2 | 1/2014 | Li et al. ........................ 382/159 |
| 8,644,646 B2 | 2/2014 | Heck ............................. 382/305 |
| 8,688,586 B2 | 4/2014 | Pride et al. ..................... 705/54 |
| 8,699,826 B2 | 4/2014 | Remedios ..................... 382/305 |
| 8,774,529 B2 | 7/2014 | Rubenstein et al. .......... 382/218 |
| 8,792,685 B2 | 7/2014 | Sangster ....................... 382/118 |
| 8,812,392 B2 | 8/2014 | Shahghasemi ......... G06Q 20/22 |
| 8,831,998 B1 | 9/2014 | Cramer et al. ...... G06Q 20/1235 |
| 8,879,837 B2 | 11/2014 | Usher ............... G06F 17/30256 |
| 8,898,171 B2 | 11/2014 | Tan ................... G06F 17/30247 |
| 8,934,717 B2 | 1/2015 | Newell et al. ........ G11B 27/034 |
| 9,489,400 B1 | 11/2016 | Haitani ............. G06F 17/30247 |
| 2002/0033844 A1 | 3/2002 | Levy et al. .................... 345/477 |
| 2003/0151611 A1 | 8/2003 | Turpin et al. ................. 345/589 |
| 2006/0204142 A1 | 9/2006 | West et al. .................... 382/305 |
| 2007/0133947 A1 | 6/2007 | Armitage et al. .............. 386/95 |
| 2007/0168513 A1 | 7/2007 | Weiskopf et al. ............ 709/225 |
| 2009/0083236 A1 | 3/2009 | Shuster ............................ 707/3 |
| 2009/0287669 A1 | 11/2009 | Bennett ............................ 707/4 |
| 2011/0029408 A1 | 2/2011 | Shusterman et al. ........ 705/27.1 |
| 2011/0167059 A1 | 7/2011 | Fallah .......................... 707/723 |
| 2011/0270697 A1 | 11/2011 | Sunkada ..................... 705/26.1 |
| 2012/0120097 A1 | 5/2012 | Sun et al. ...................... 345/619 |
| 2012/0179673 A1 | 7/2012 | Kelly et al. ................... 707/731 |
| 2013/0019257 A1* | 1/2013 | Tschernutter et al. ............ 725/4 |
| 2013/0117258 A1 | 5/2013 | Linsley et al. ................ 707/722 |
| 2013/0167105 A1 | 6/2013 | Goldman et al. ............. 717/101 |
| 2013/0335582 A1 | 12/2013 | Itasaki et al. ........... G06F 3/005 |
| 2014/0046792 A1 | 2/2014 | Ganesan ............ G06Q 30/0611 |
| 2014/0122283 A1 | 5/2014 | Mehra et al. ..... G06F 17/30277 |
| 2014/0289134 A1 | 9/2014 | Sutton .......................... 705/300 |
| 2014/0310264 A1 | 10/2014 | D'Ambrosio ..... G06F 17/30265 |
| 2014/0324838 A1 | 10/2014 | Sako et al. ........ G06F 17/30256 |
| 2014/0351021 A1 | 11/2014 | Higbie .............. G06Q 30/0206 |
| 2014/0351284 A1 | 11/2014 | Ikonomov .......... G06F 17/30522 |
| 2015/0018094 A1 | 1/2015 | Watari et al. ............. A63F 13/60 |
| 2015/0161258 A1 | 6/2015 | Yee et al. ......... G06F 17/30864 |
| 2015/0324394 A1 | 11/2015 | Becker et al. .... G06F 17/30268 |
| 2015/0363503 A1 | 12/2015 | Scheuerman ..... G06F 17/30893 |
| 2016/0035055 A1* | 2/2016 | Perkins et al. ....... G06Q 50/184 |
| | | 705/310 |
| 2016/0180193 A1 | 6/2016 | Masters et al. ....... G06K 9/6202 |
| 2017/0052981 A1 | 2/2017 | Koch et al. ....... G06F 17/30268 |
| 2017/0053103 A1 | 2/2017 | Koch et al. ............. G06F 21/10 |
| 2017/0053104 A1 | 2/2017 | Koch et al. ............. G06F 21/16 |
| 2017/0053189 A1 | 2/2017 | Koch et al. ............ G06K 9/6255 |
| 2017/0053332 A1 | 2/2017 | Koch et al. ........ G06Q 30/0625 |
| 2017/0053365 A1 | 2/2017 | Koch et al. .......... G06Q 50/184 |

OTHER PUBLICATIONS

"Pre-Interview Communication", U.S. Appl. No. 14/827,670, Feb. 17, 2017, 3 pages.

"Pre-Interview Communication", U.S. Appl. No. 14/827,836, Jan. 26, 2017, 4 pages.

"Pre-Interview Communication", U.S. Appl. No. 14/828,085, Feb. 28, 2017, 4 pages.

* cited by examiner

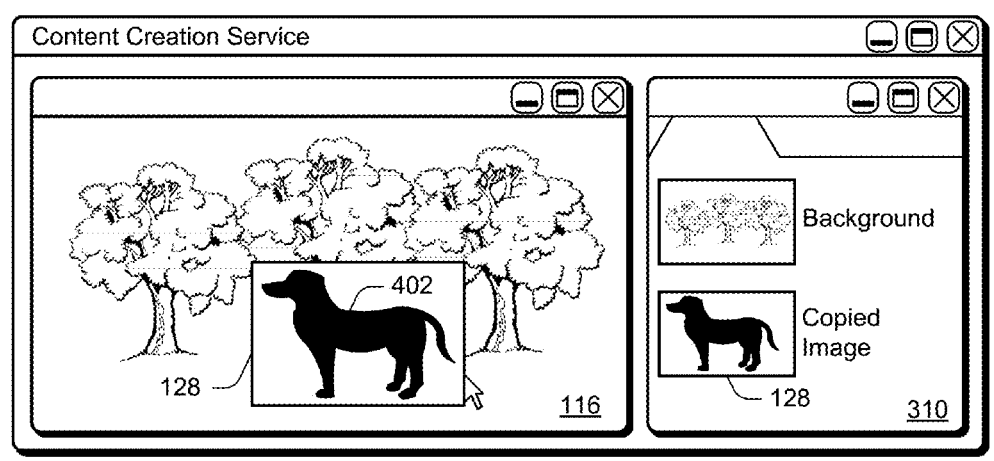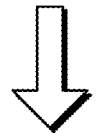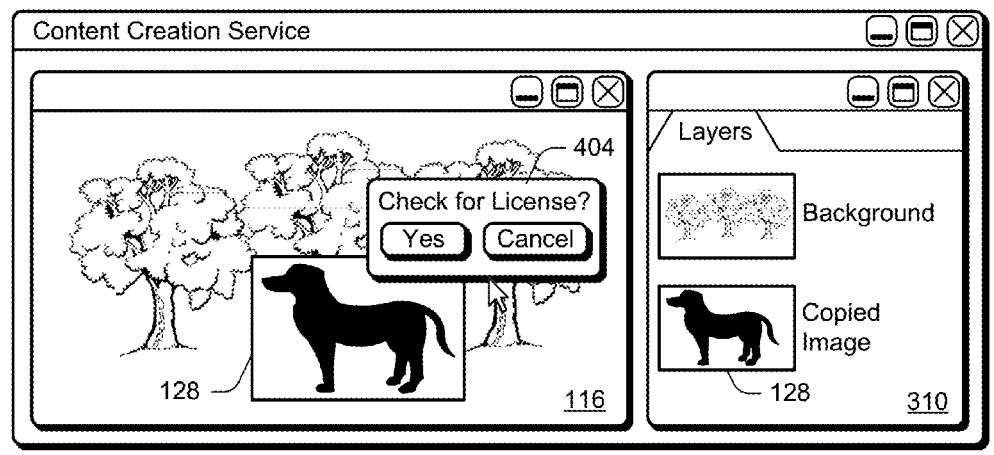
Fig. 4

800 ─┐

802
Configure a first version of an item of content created through interaction with the content creation service to include a first preview of a first image that is available for licensing but is not licensed from a content sharing service

↓

804
Configure a second version of the item of content created through interaction with the content creation service to include a second preview of a second image that is different than the first image and is available for licensing but is not licensed from the content sharing service

↓

806
Share the first and second versions of the item of content via a network responsive to selection of a sharing option as part of the content creation service

↓

808
Output an option by the one or more computing devices of the content creation service to license the first or second images from the content sharing service as a replacement of the first or second previews, respectively, for the first or second versions of the item of content that is selected as a result of the sharing

*Fig. 8*

CONTENT CREATION AND LICENSING CONTROL

BACKGROUND

Content creation services provide an ability for users to create a variety of content. For instance, content creation services may include graphics editors to originate content and modify existing content through functionality that includes raster graphics tools, image filters, and so on. Other functionality included as part of the content creation services may include an ability to generate and layout webpages, marketing content, presentations, and other content consumable by that user or other users.

As part of content creation in digital environments, users may obtain images for inclusion in the content from a variety of sources. A marketing professional, for instance, may initiate an image search using a search engine and locate a particular image for inclusion as part of a marketing campaign. The marketing professional, however, may not be aware of who created the image or even if the person currently using the image has rights to do so. Consequently, this may force the marketing professional to manually track down a creator of the image or commission creation of new content, which can be both costly, frustrating, prone to error, and expose the professional to potential liability for use of images even in some instances in which the professional believed such use is authorized through interaction with a source that did not actually have rights to the image.

SUMMARY

A digital environment is described that includes techniques and system that support content creation and licensing control. In a first example, a content creation service is configured to support content creation using an image along with functionality to locate the image or a similar image that is available for licensing. In another example, previews of images are used to generate different versions of content along with an option to license images previewed in an approved version of the content. In a further example, fingerprints are used to locate images used as part of content creation by a content creation service without leaving a context of the service. In yet another example, location of licensable versions of images is based at least in part on identification of a watermark included as part of an image. In an additional example, an image itself is used as a basis to locate other images available for licensing by a content sharing service.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 3-5 depict user interfaces and FIG. 6 depicts a procedure in an example implementation in which images obtained by a user are used as placeholders as part of content creation and then used to obtain licensable versions of the images.

FIG. 7 depicts a system and FIG. 8 depicts a procedure in an example implementation in which different versions of images are created using previews.

DETAILED DESCRIPTION

Overview

Figure 1:
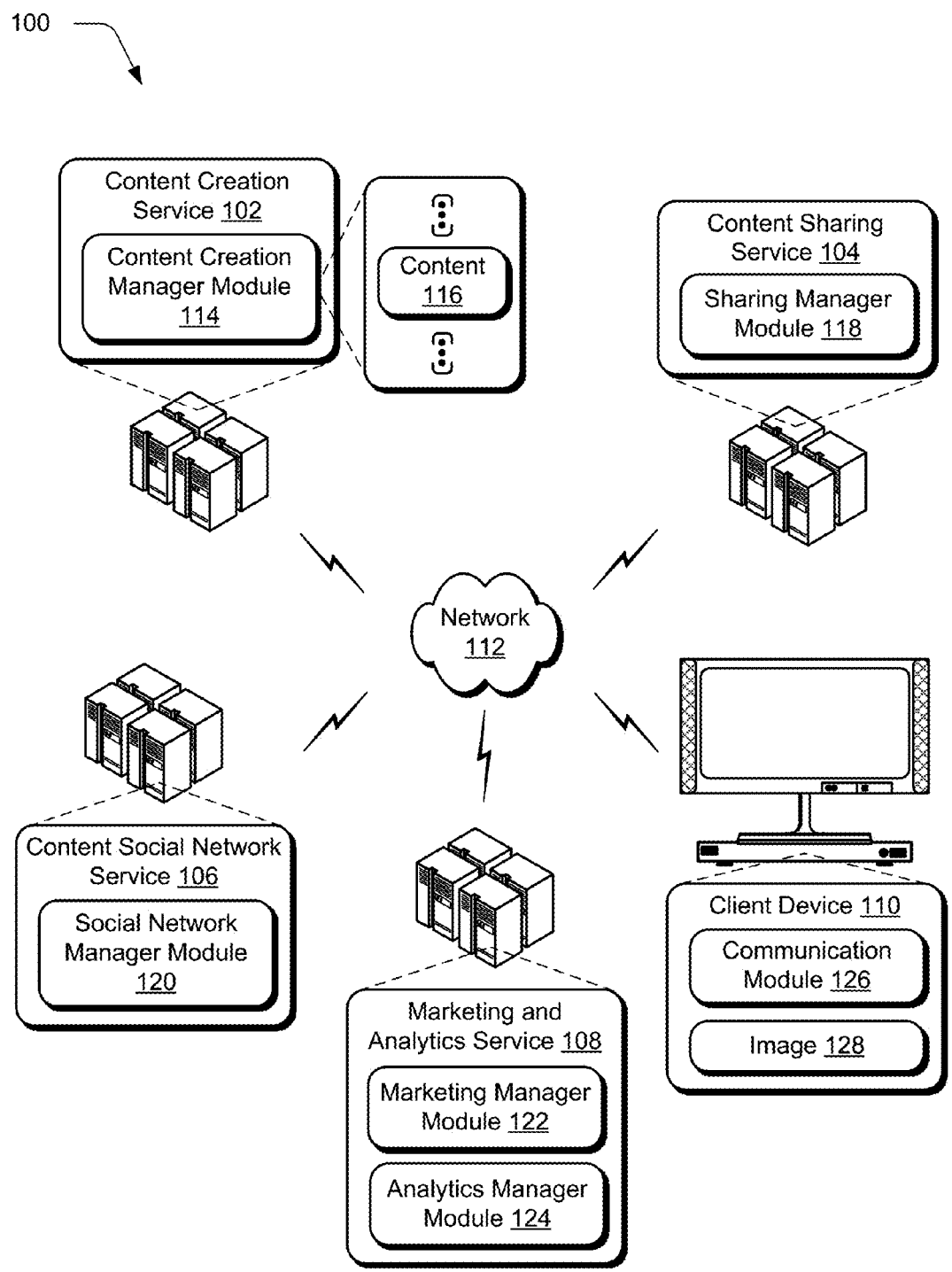
FIG. 1 is an illustration of an environment in an example implementation that is operable to employ content creation and licensing control techniques described herein.

Content creation services are configured as part of digital environments to provide a variety of functionality usable by creative professionals and even casual users to create a variety of content, such as webpages, marketing campaigns, presentations, and so forth. As part of creating the content, a user may locate images within the environment for inclusion as part of the content, e.g., an image of a landscape for use as a background in a webpage. However, there are no current mechanisms that are accessible as part of conventional content creation services to obtain rights to images that are located outside of the content creation service (e.g., as part of an image search using an Internet search engine, uploaded by a user) as part of content creation. Accordingly, this may expose the users for to liability for use of such images, may be inefficient and even inaccurate in regard to attempts to obtain permission for use of the images, and so forth.

Content creation and licensing control techniques and systems are described within a digital environment. In one or more implementations, techniques are employed by a content creation service to support content creation to include images as well as manage licenses for use of those images. In this way, users may avoid the downfalls and potential liability of conventional techniques described above through location of images along with an ability to license use of the images.

In a first example, a content creation service is configured to support content creation using an image obtained outside of the content creation service, such as an image uploaded from a user's computer, copied from an image search performed by a search engine, and so forth. The image is used as an exemplar (e.g., serves as a typical example or model) of subject matter that is desired by a user for use in creating the content. In this way, a user may initiate creation of the content and use images as placeholders having desired subject matter.

The content creation service also includes functionality to communicate with a content sharing service (e.g., a stock image photo service) to locate the image or a similar image that is available for licensing. The content creation service, for instance, may communicate the image to the content sharing service, metadata associated with the image, a fingerprint representative of characteristics of the image, and so on to the content sharing service. The content sharing service locates images available for licensing and indicates results of the search back to the content creation service. The content creation service then outputs an option to license one or more of the located images which are then used to replace the image used as the exemplar. Thus, in this example a user interacting with the content creation service may remain in a context of the content creation service and obtain images available for licensing for inclusion as part of the content. Further discussion of this example is described in relation to FIGS. 2-6 in the following.

In another example, previews of images, such as versions of the images that include watermarks or are a low-resolution version of the image, are used to generate different versions of content through interaction with a content creation service. A marketing professional, for instance, may create multiple versions of a marketing campaign using different previews of images that are shared for approval by a marketing professional and/or a client of the marketing professional. On option is also provided to license images previewed in an approved version of the content, which may be selected by the marketing professional, a creator of the content, and so on. Thus, in this example content creation is initiated and licensing performed once a desired version of content is obtained, further discussion of which is found in relation to FIGS. 7 and 8 in the following.

In a further example, fingerprints are used to locate images used as part of generating content by a content creation service. The content creation service, as previously described, includes functionality to generate content, such as graphics editors, layout tools, image filters, and so on. As part of that functionality, the content creation service may also be configured to generate a fingerprint of an image usable to represent characteristics of the image, e.g., by hashing values of pixels of the image. The fingerprint is then used to determine whether the image is available for licensing by a content sharing service and a result of the determination is output along with the functionality exposed in a user interface of the content sharing service remains displayed. In this way, a user remains in a context of the content sharing service and is provided with an ability to license an image, e.g., for an image initially obtained "outside" of the content creation service. Further discussion of this example is included as part of the following description of FIGS. 9-11.

In yet another example, location of licensable versions of images is based at least in part on identification of a watermark included as part of an image. An image used as a preview as part of content creation as described above may include a watermark, such as an identifiable pattern formed in pixels in the image made by altering values of the pixels, e.g., lightness/darkness, shadowing, contrast, and so on. In some instances, the watermark identifies a source from which the image is available, such as a content sharing service. Accordingly, functionality is included as part of the content creation service to detect watermarks and from this identify a corresponding content sharing service. The functionality also includes an ability to provide an option to license the image from the identified content sharing service, which may also be performed within a context of the content sharing service and/or involve navigation to the content sharing service. Further discussion of this example is included in reference to FIGS. 12 and 13.

In an additional example, an image itself is used as a basis to locate other images available for licensing by a content sharing service. Conventionally, image searches of content sharing services are performed using keywords. In some instances, however, a user may obtain an image but be unaware of "where it came from" or who has rights to license the image. Accordingly, a content sharing service in this example is configured to search images based on similarity to a received image to locate images available for licensing. Further discussion of this example may be found in relation to FIGS. 14-15.

In the following discussion, an example environment is first described that is configured to employ the content creation and licensing techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ content creation and licensing techniques described herein. A digital medium environment is illustrated that is configured to generate and control suggestions usable to guide content creation. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 16.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Fotolia® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. As part of content creation, the client device 110 may provide an image 128 for inclusion as part of the content 116, which may be obtained from a variety of sources outside of the content creation service 102. However, as previously described conventional techniques may make it difficult to locate a licensable version of the image 128. Accordingly, techniques are described herein to support content creation and licensing control. A variety of other arrangements of functionality represented by the entities of the environment 100 of FIG. 1 are also contemplated without departing from the spirit and scope thereof. Having now described an environment that is usable to implement the techniques described herein, examples of the content creation and licensing techniques are described in the following.

Figure 2:
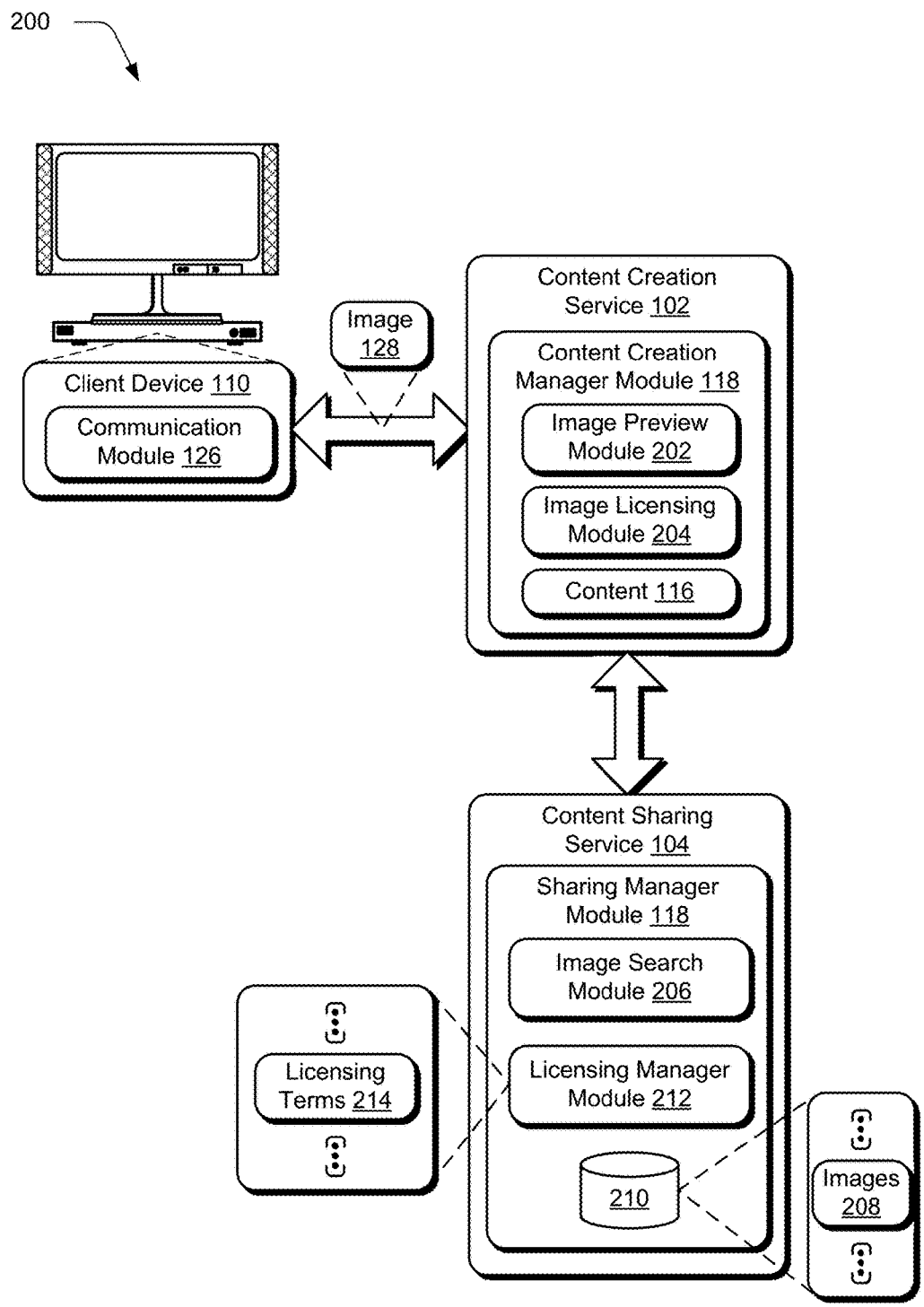
FIG. 2 depicts a system.
Figure 3:
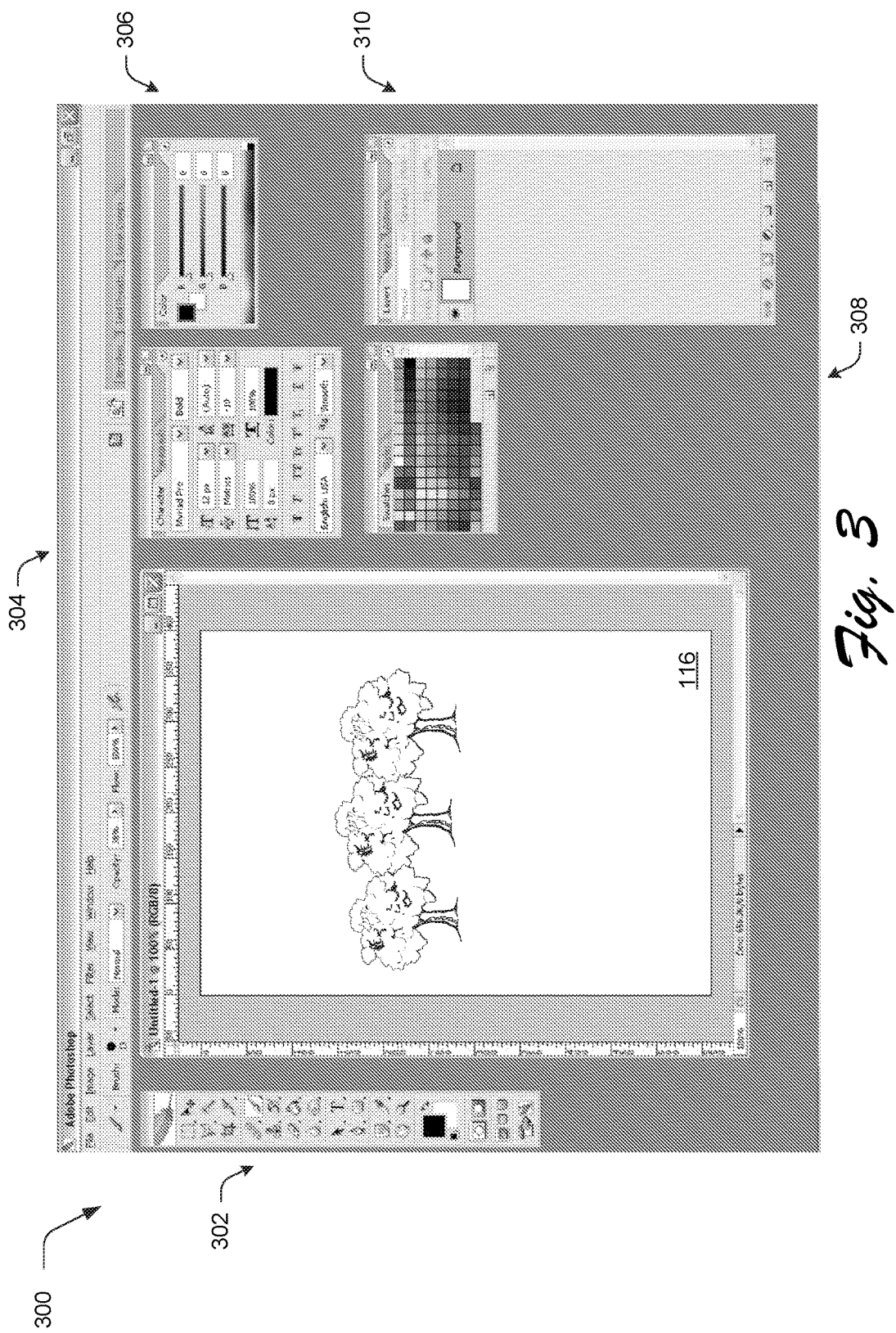
Figure 5:
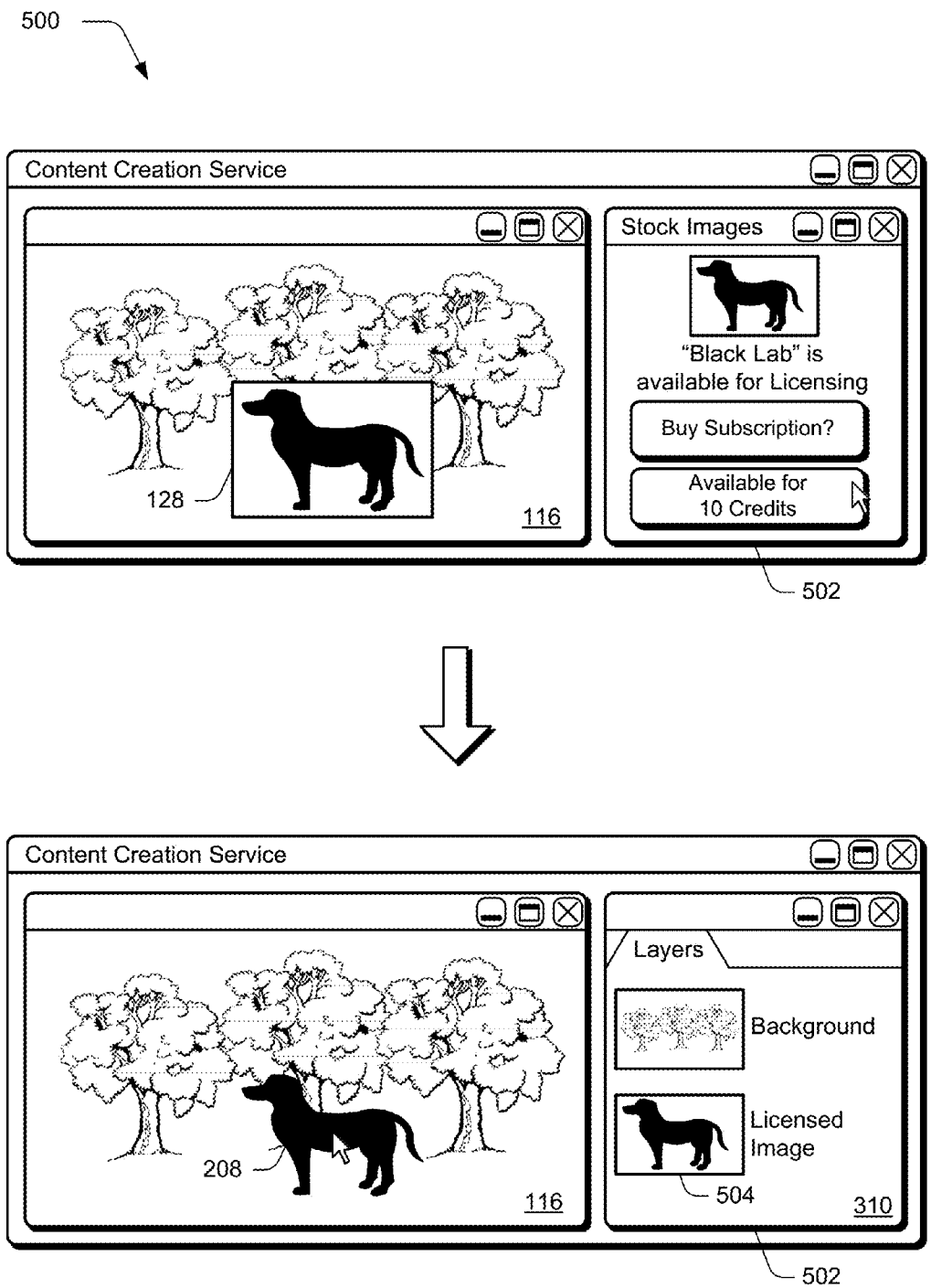
Figure 6:
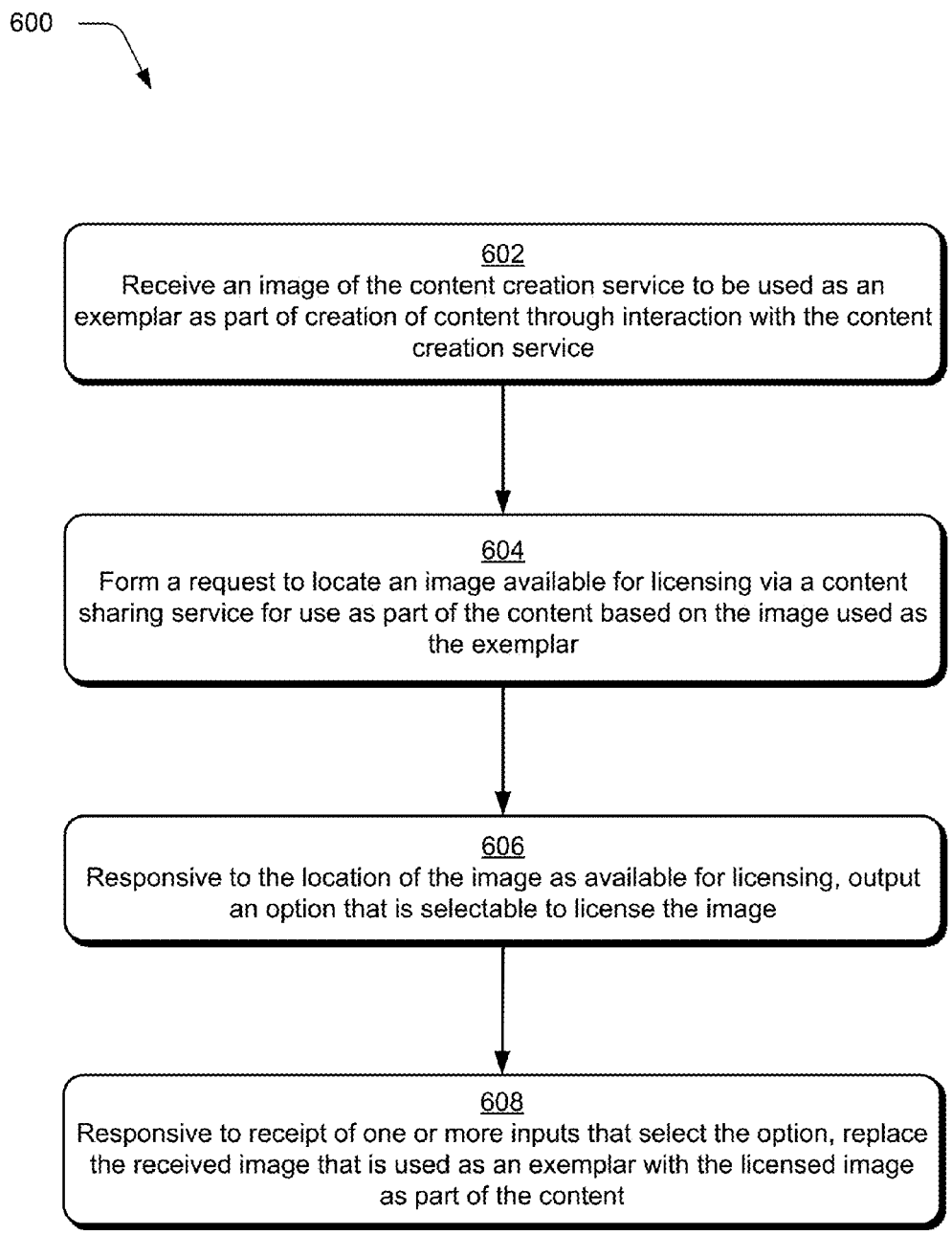

FIG. 2 depicts a system 200, FIGS. 3-5 depict user interfaces 300, 400, 500, and FIG. 6 depicts a procedure 600 in an example implementation in which images obtained by a user are used as placeholders as part of content creation and then used to obtain licensable versions of the images. In the following, reference is made interchangeably to FIGS. 2-6.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

This example begins with receipt of an image by one or more computing devices of a content creation service 102 to be used as an exemplar as part of creation of content through interaction with the content creation service 102 (block 602). A user of a client device 110, for instance, may interact with a content creation service 102 via a network 112 to create content 116, such as a webpage, marketing campaign, presentation, and so forth as described in relation to FIG. 1. As part of this interaction, a user interface 300 is output using a communication module 126 (e.g., client side functionality usable to interact with the content creation service 102) having functionality that is usable to create content.

As shown in FIG. 3, the user interface 300 includes representations of functionality that is selectable by a user to edit graphics of content 116. This includes tools to specify brush shapes 302, characters 304, colors 306, swatches 308, layers 310, and so on to create content 116. Creation of content includes originating the content 116 as well as modifying existing content 116. In the illustrated example, a user has entered a context of content creation within the user interface 300 to create a greeting card that already includes a user-drawn background.

As part of creating the content 116, an image 128 of a dog is copied to the user interface 400 by the user and included as part of the content 116. The user, for instance, may perform an image search using a third-party search engine, locate the image 128, and copy the image 128 as an exemplar of subject matter desired by the user for inclusion as part of the content 116. The image 128 is an exemplar in that it is representative of subject matter desired by the user for inclusion as part of the content, whether the actual image itself or having characteristics of that image. Once copied in, a representation 402 is indicated as a layer 310 of the content 116 within the user interface.

The content creation service 102 as previously described includes a content creation manager module 118 that is representative of functionality to create content 116. Examples of this functionality include an image preview module 202 and an image licensing module 204. The image preview module 202 is representative of functionality to manage interaction with previews used as part of creation of the content 116, such as the image 128 used as the exemplar. The image licensing module 204 is representative of functionality to manage inclusion of licensable versions of the image 128 that is used as the exemplar.

For example, the image preview module 202 may detect that a user has copied in the image 128 from a source outside the content creation service 102. As described above, the image 128 is to be used as an exemplar of content for inclusion and may also act as a preview in that the image 128. The preview, for instance, may be configured as a low resolution version of an image, include a watermark 402, and so on. In this way, a user may include the image 128 as a preview that supports a look-and-feel of subject matter that may be desired for inclusion as part of the content as described above.

Responsive to this detection, the image licensing module 204 is caused to output an option 404 that is selectable by a user to locate the image 128 or a similar image that is available for licensing. Other examples are also contemplated, such as to perform automatic detection and location without requiring user selection of the option. In either case, the image licensing module 204 forms a request to locate an image available for licensing via a content sharing service 104 for use as part of the content 116 based on the image used as the exemplar (block 604). The image licensing module 204, for instance, may form the communication that is transmitted over the network 112 for receipt by the content sharing service 104. As previously described, the content sharing service 104 includes a sharing manager module 118 that is representative of functionality configured to manage sharing of images that are available for licensing.

The sharing manager module 118, for instance, includes an image search module 206 that is representative of search images 208 illustrated as stored in storage 210 of the service. In this example, the image 128 used as the exemplar is employed as a basis for the search. This may be performed by forming a fingerprint of the image 128 (e.g., a hash of pixel values), use of metadata associated with the image 128 (e.g., tags), communication of the image 128 itself, and so on. Thus, similarity of the image 128 used as the exemplar and preview of desired subject matter for the content 116 may be defined in a variety of ways for comparison in relation to images 208 available for licensing via the content sharing service 104.

Once found, a licensing manager module 212 of the content sharing service 104 obtains licensing terms 214 for licensing the similar images 208, which is then communicated back to the content creation service 102 and/or directly to the client device 110. Licensing terms 214 may include cost, duration of license, or permitted use associated with the license.

An option 502 that is selectable to license the image is then output responsive to the location of the image as available for licensing (block 606). The option, for instance, may include licensing terms 214 for the image, whether available via a subscription, purchase for a fee, and so on. In one or more implementations, the image licensing module 204 determines whether a user has an account to license images from the content sharing service 104 and provides corresponding options such that the user is not forced to separately login to the content sharing service 104.

A user may thus select the option 502 to obtain the licensable image 208 from the content sharing service 104. In one or more implementations, responsive to receipt of one or more inputs that select the option, the received image that is used as an exemplar is replaced with the licensed image as part of the content 116 (block 608), e.g., a version in which the watermark is removed. As illustrated in FIG. 5, for instance, the received image 128 used as the exemplar is replaced with the image 208 licensed from the content sharing service 104. A representation 504 of the image is included as a layer 310 of the content 116 displayed concurrently with the content 116.

Thus, in this example a user remains within a context of the content sharing service 104 (e.g., within functionality usable to create the content 116 in the user interface) without navigating outside of this context. This allows a user to efficiently and easily obtain licensable versions of images when desired (e.g., such as to finalize creation of content 116 for dissemination) while permitting the user to use previews of the content 116 to "try out" different subject matter. Other examples are also contemplated. For example, a user may also navigate to interact directly with the content sharing service 104, a notification may be received when a licensed version of an image is provided by another user (e.g., a marketing professional to a content creation professional), and so on as further described below.

Figure 7:
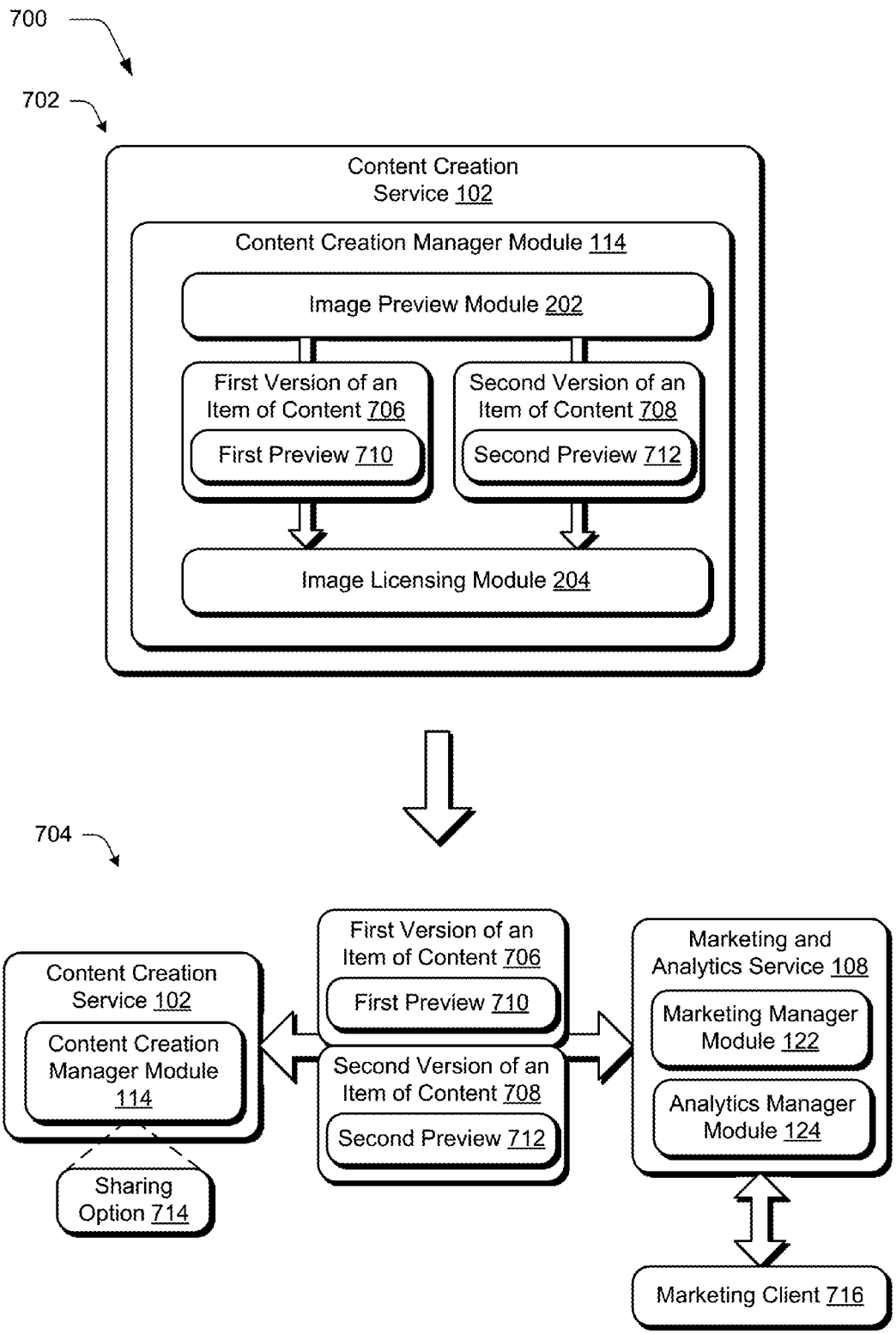

FIG. 7 depicts a system 700 and FIG. 8 depicts a procedure 800 in an example implementation in which different versions of images are created using previews. After approval of a particular version, an option is utilized to obtain licensable versions of the previewed images in the particular version. The system of FIG. 7 is illustrated using first and second stages 702, 704. In the following, reference is made interchangeably to FIGS. 7 and 8.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

At the first stage 702 of FIG. 7, the content creation manager module 114 of the content creation service 102 includes an image preview module 202 and an image licensing module 204. As before, the image preview module 202 is representative of functionality to manage inclusion of previews of subject matter as part of a content creation process. The image licensing module 204 is representative of functionality to obtain licensable versions of the images for inclusion as part of the content 116.

In this example, suppose that a content creation professional is tasked by a marketing professional to create a marketing campaign for a marketing client. The marketing professional begins by collecting a list of characteristics of the marketing campaign from the client and from this, determines that stock images are to be included as part of the marketing campaign. Accordingly, the marketing professional gives access to a content sharing service 104 for a content creation professional to obtain images that are licensable for inclusion as part of the content 116.

The content creation professional then interacts with the content creation manager module 114 to create content using previews of content obtained from the content sharing service 104. For example, the content creation professional may configure first and second versions of an item of content 706, 708 having first and second previews 710, 712 of images available for licensing but are not licensed from the content sharing service 104 (blocks 802, 804). In this instance, the first and second previews 710, 712 are exemplars of subject matter that is used as part of creation of the content but are not yet licensed from the content sharing service 104. In this way, the content creation professional is given the flexibility to "try different things" without being forced to actually to purchase licenses to the images at this time.

At the second stage 704, a sharing option as part of the content creation service is selected which causes the first and second versions of the item of content to be shared via a network (block 806). Continuing with the previous example, the content creation professional has created first and second versions of an item of content 706, 708 for approval. These versions are communicated to the marketing and analytics service 108 for viewing by the marketing professional in order to obtain feedback. The marketing professional, for instance, may add annotations including markups, comments, and so on to a desired version of the content, which is then communicated back to the content creation service 102 for further modification by the content creation professional.

The marketing professional may also share the first and second versions of the item of content 706, 708 with a marketing client 716, which may also provide annotations which are communicated back through the content creation service 102 to the content creation professional. In this way, a "back-and-forth" feedback loop may be used to create a final version of the content that is approved.

Once approved, an option is output by the content creation service to license the first or second images from the content sharing service as a replacement of the first or second previews, respectively, for the first or second version of the item of content that is selected as a result of the sharing (block 808). The option, for instance, may be tied to approval received from the marketing professional for the first or second versions of the item of content 706, 708. Once approval is received, the image licensing module 204 obtains a license for the first or second previews 710, 712.

An indication that the licensed images are available is then output to the content creation professional, which may be used to automatically replace the first or second previews 710, 712 within respective versions, and so on. In another example, the option is selected by the content creation professional and tied to the marketing professional's account to obtain stock images as described in relation to the first stage 702. In this way, different versions of content may be created and previews used to enable a content creation process to begin use of those previews without obtaining licenses to the images until a final version is obtained.

Figure 9:
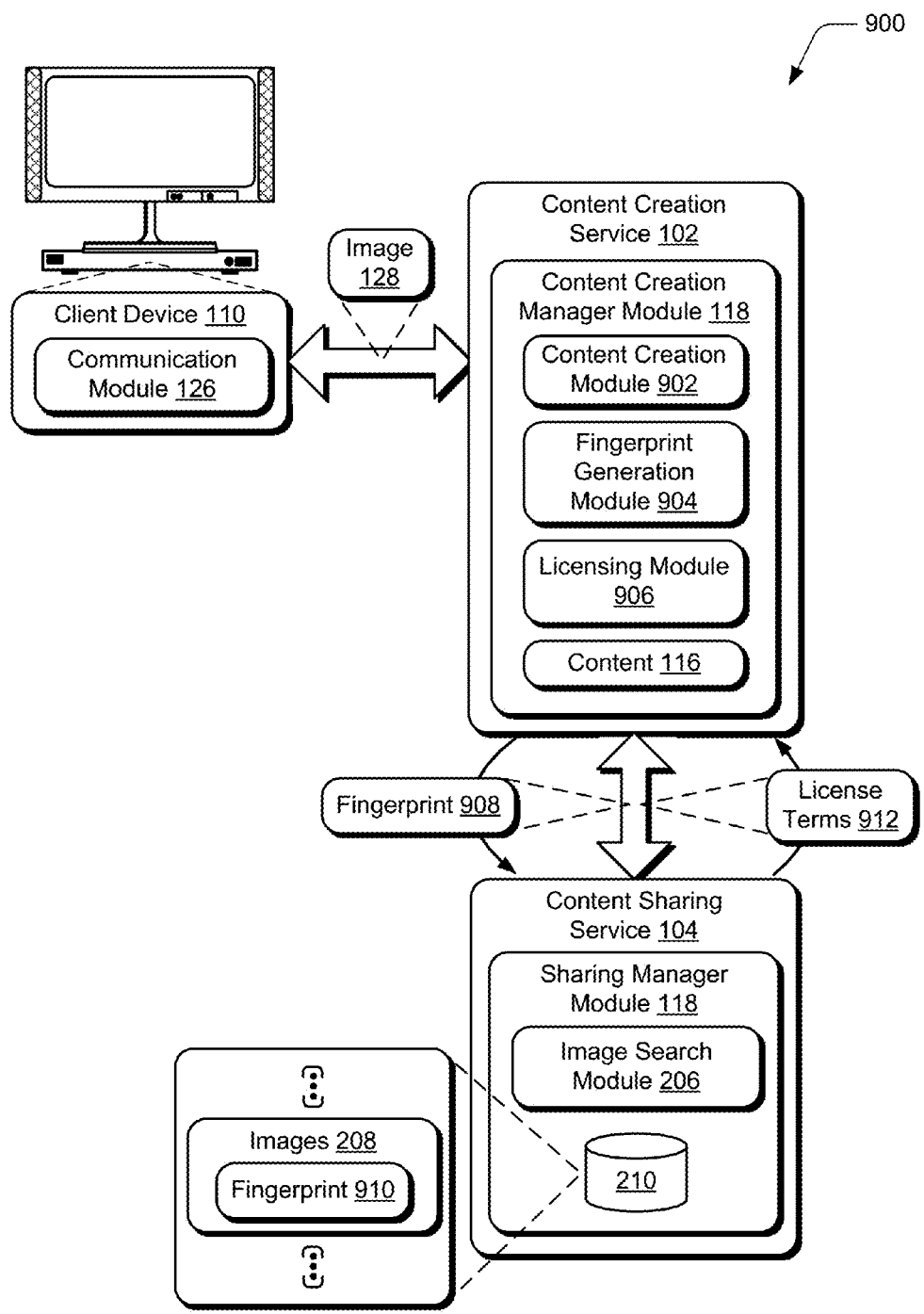
FIG. 9 depicts a system.
Figure 10:
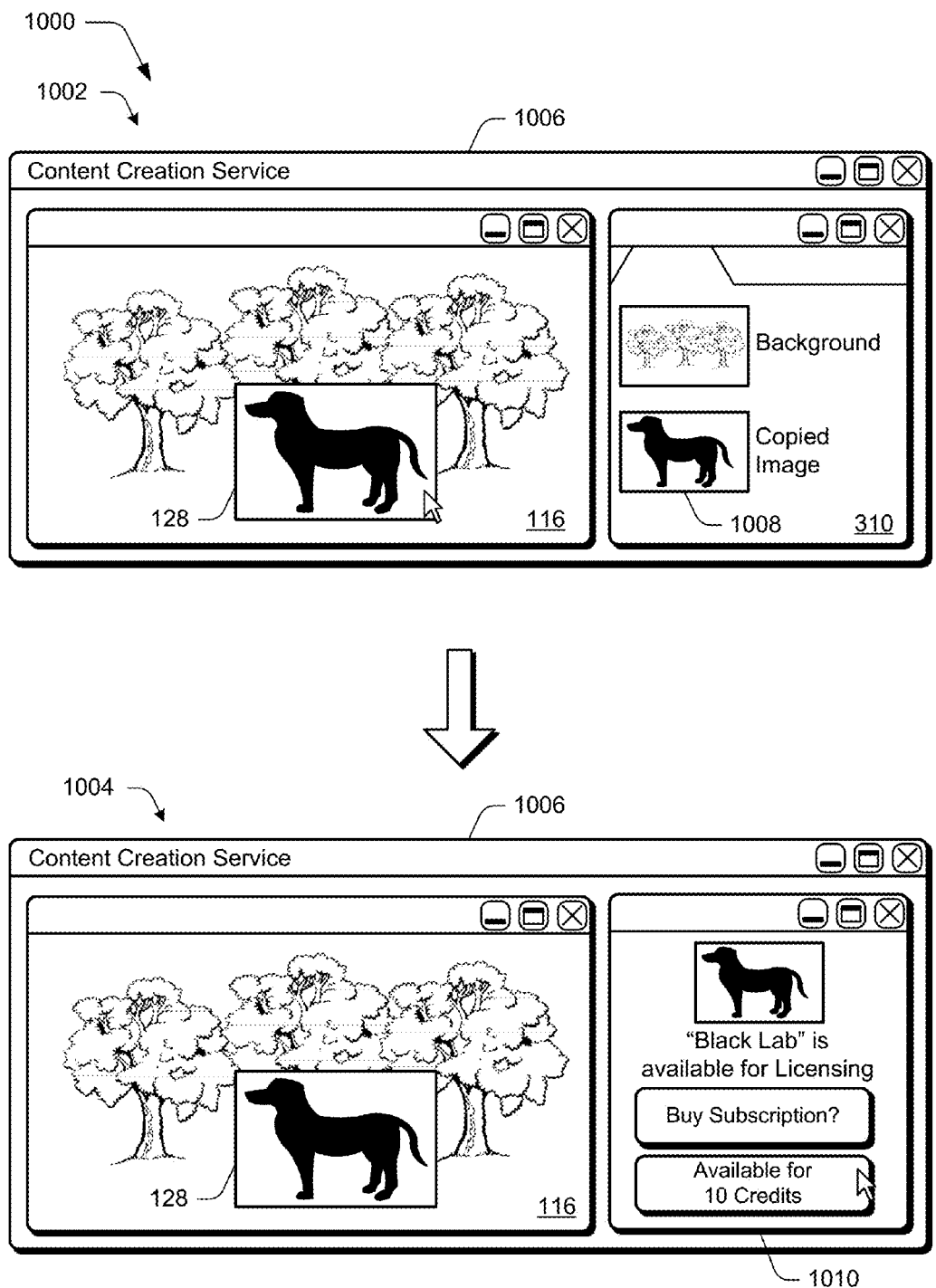
FIG. 10 depicts an example implementation of user interfaces.
Figure 11:
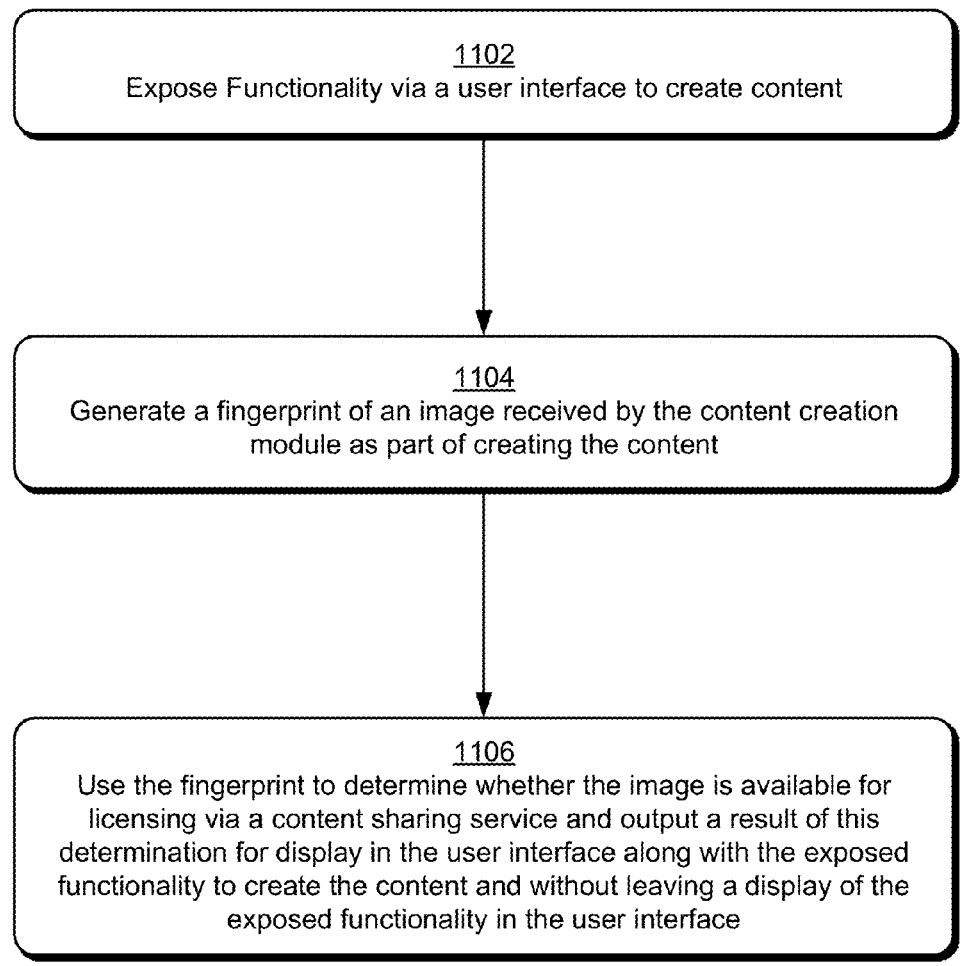
FIG. 11 depicts a procedure in which fingerprints are used to locate images used as part of generating content by a content creation service.

FIG. 9 depicts a system 900, FIG. 10 depicts an example implementation 1000 of user interfaces, and FIG. 1100 depicts a procedure 1100 in which fingerprints are used to locate images used as part of generating content by a content creation service 104. The content creation service 104, as previously described, includes functionality to generate content, such as graphics editors, layout tools, image filters, and so on. As part of that functionality, the content creation service 104 may also be configured to generate a fingerprint of an image usable to represent characteristics of the image, e.g., by hashing values of pixels of the image.

The fingerprint is then used to determine whether the image is available for licensing by a content sharing service 104 and a result of the determination is output. Additionally, the functionality exposed in a user interface of the content sharing service remains displayed during this determination. In this way, a user remains in a context of the content sharing service and is provided with an ability to license an image, e.g., for an image initially obtained "outside" of the content creation service. In the following, reference is made interchangeably to FIGS. 9, 10, and 11.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

In this example, functionality is exposed via a user interface to create content (block 1102) by a content creation service 102. As shown in FIG. 3, for instance, the user interface 300 may include representations of functionality that is selectable by a user to edit graphics of content 116. This includes tools to specify brush shapes 302, characters 304, colors 306, swatches 308, layers 310, and so on to create content 116, creation of content including originating the content as well as modifying existing content 116. Truncated examples of this functionality are shown at the first and second stages 1002, 1004 of FIG. 10.

As before, a content creation professional interacting with client device 110 provides an image 128 to a content creation service 102 as part of content creation 116. The content creation manager module 118 includes functionality to create content as well as support content creation, e.g., licensing. Illustrated examples of which include a content creation module 902, fingerprint generation module 904, and licensing module 906. The content creation module 902 is representative of the functionality to edit graphics of content 116 as described above.

The fingerprint generation module 904 is representative of functionality to generate a fingerprint 908 from the image 128 received by the content creation module 902 as part of creating the content (block 1104). The user, as before, may upload the image 128 to the content sharing service 104, e.g., locally from the client device 110, located as part of a third-party image search, and so forth. The image 128 is displayed in the user interface 1006 along with the content 116 and concurrently with a representation 1008 of the image as a layer 310.

Upon receipt of the image 128 in this example, the content creation service 102 automatically and without user intervention determines whether a licensable version of the image 128 is available. To do so, the fingerprint generation module 904 generates a fingerprint 908 of the image 128. The fingerprint 908 is a reduced size representation of characteristics of the image, such as by performing a hash of values of pixels of the image 128. Other techniques usable to generate a fingerprint 908 of the image 128 are also contemplated.

The fingerprint is communicated by the licensing module 906 to the content sharing service 104. An image search module 206 then compares the fingerprint 908 of the image 128 to fingerprints 910 of images 208 available for licensing from the service. In this way, the image search module 206 may quickly, accurately, and efficiently determine whether that image 128 or a similar image is available through comparison of the fingerprints 908, 210.

If available, license terms 912 are provided by the content sharing service 104 back to the licensing module 906 of the content creation service 102. The license terms are then output in the user interface 1010 that are selectable by a user to license the image. Accordingly, a user is provided an option to license the image automatically and without user intervention as part of interaction with the content creation service 102 to create the content 116.

Thus, the fingerprint is used to determine whether the image is available for licensing via the content sharing service and a result of this determination is output for display in the user interface along with the exposed functionality to create the content and without leaving a display of the exposed functionality in the user interface (block 1106). In this example, a fingerprint is used to locate a version of the image that is available for licensing. Other examples are also contemplated, such as to leverage a watermark included as part of the image, an example of which is described in the following and shown in a corresponding figure.

Figure 12:
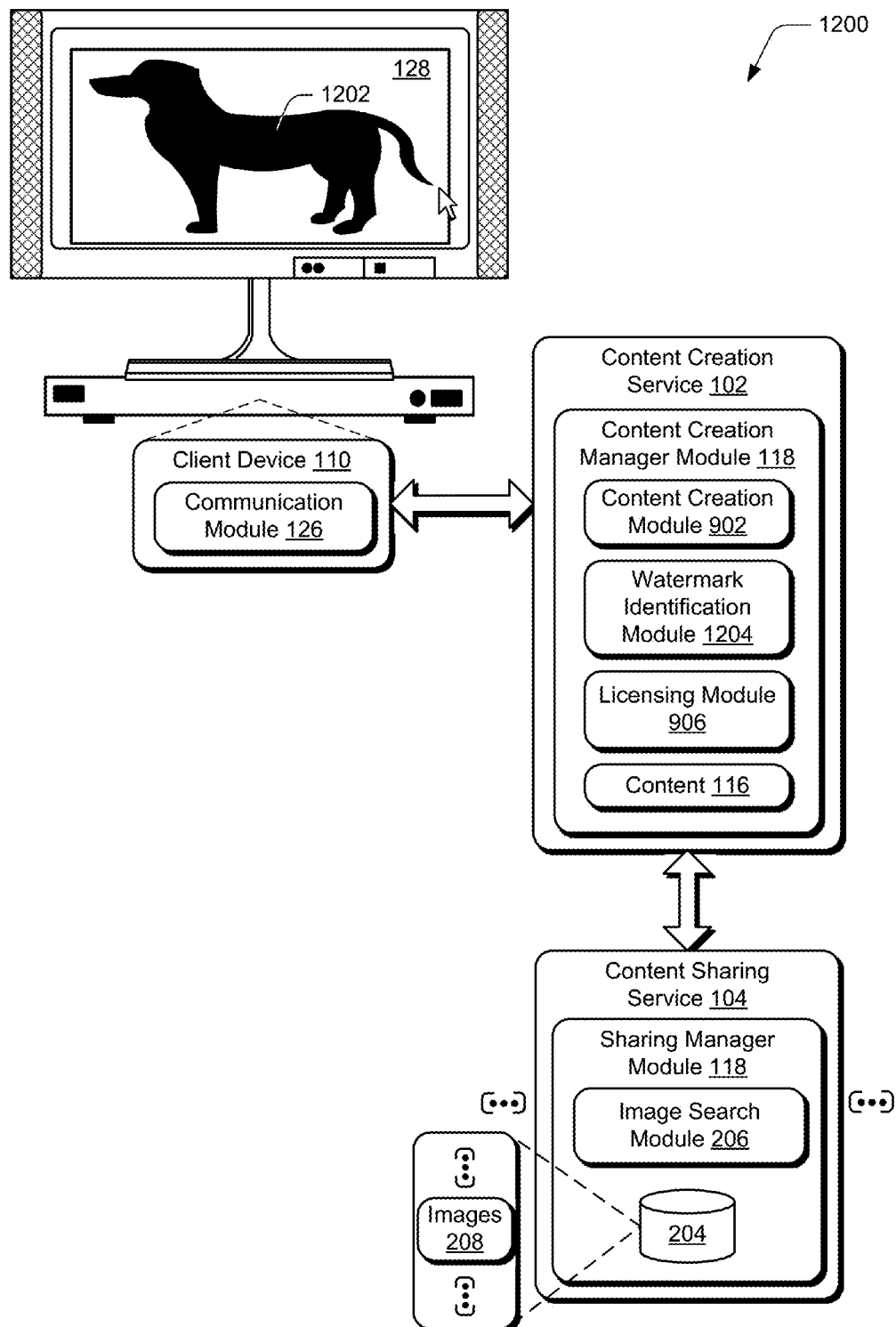
FIG. 12 depicts a system and FIG. 13 depicts a procedure in an example implementation in which location of licensable versions of images is based at least in part on identification of a watermark included as part of an image.
Figure 13:
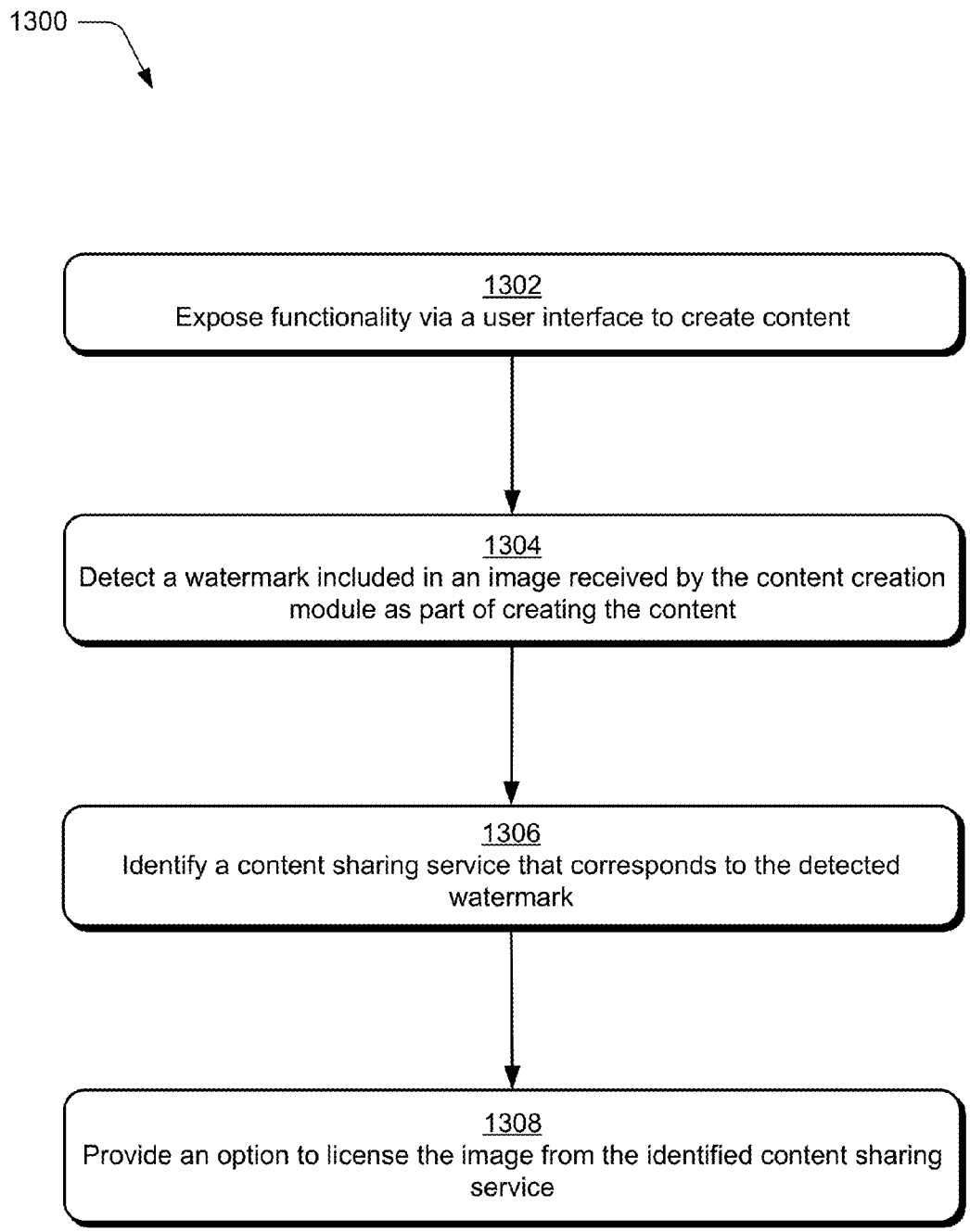

FIG. 12 depicts a system 1200 and FIG. 13 depicts a procedure 1300 in an example implementation in which location of licensable versions of images is based at least in part on identification of a watermark included as part of an image. An image used as a preview as part of content creation as described above may include a watermark, such as an identifiable pattern formed in pixels in the image made by altering values of the pixels, e.g., lightness/darkness, shadowing, contrast, and so on. In some instances, the watermark identifies a source from which the image is available, such as a content sharing service.

Accordingly, functionality is included as part of the content creation service to detect watermarks and identify a corresponding content sharing service. The functionality also includes an ability to provide an option to license the image from the identified content sharing service, which may also be performed within a context of the content sharing service and/or involve navigation to the content sharing service. In the following, reference is made interchangeably to FIGS. 12 and 13.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Like the previous example, functionality is exposed via a user interface to create content (block 1302), instances of which are shown in the user interface 300 of FIG. 3 as including representations of functionality that is selectable by a user to edit graphics of content 116. This includes tools to specify brush shapes 302, characters 304, colors 306, swatches 308, layers 310, and so on to create content 116.

As part of creation of the content, an image 1202 is provided to the content creation service 102 from a content creation professional through interaction with a client device 110. The image 1202 in this instance includes a watermark 1202 that is used to limit unauthorized usage of the image 1202. The watermark 1202 is created by altering values of pixels in the image which in this case creates an identifiable pattern that is not related to the actual subject matter of the image 128. In the illustrated example, the watermark 1202 is indicative of a particular content sharing service 104, from which, the image 128 is available. Thus, the watermark 1202 is usable to determine a location of where the image 128 is available for licensing.

Accordingly, upon receipt of the image 128 the content creation service 102 employs a watermark identification module 1204 that is representative of functionality to detect the watermark included in the image received by the content creation module as part of creating the content (block 1304). From the watermark, a content sharing service is identified that corresponds to the detected watermark (block 1306). The watermark identification module 1204, for instance, compares text and/or symbols included in the watermark 1202 to a list of known watermarks. If a match is found, a corresponding network address is leveraged by the licensing module 906 to navigate to the content sharing service 104.

In order to perform the search, the image 128 and/or information associated with or generated from the image, such as metadata or fingerprints, are provided by the content creation service 102 to the content sharing service 104 for use by the image search module 206 to locate a matching image from the plurality of images 208. A result of the search, such as a particular webpage from which the matching image 208 is available is communicated back to the content creation service 102.

The licensing module 906 of the content creation service 102 then provides an option to license the image from the identified content sharing service (block 1308). The option, for instance, may include a window within the user interface 300 to navigate to the content sharing service 104 to license the image. Additionally, the licensing module 906 may also include functionality usable to determine if a user has an account with the content sharing service 104, and if so, login the user to obtain a licensable version of the image automatically and without user intervention. In this way, a user may remain within a context of the content creation service 102 and yet still be provided with options to obtain licensable versions of images from third-party content sharing services 104. The examples above describe techniques usable to obtain images within a context of a content creation service, these techniques may also be implemented through direct interaction with the content sharing service 104, an example of which is described in the following and shown in corresponding figures.

Figure 14:
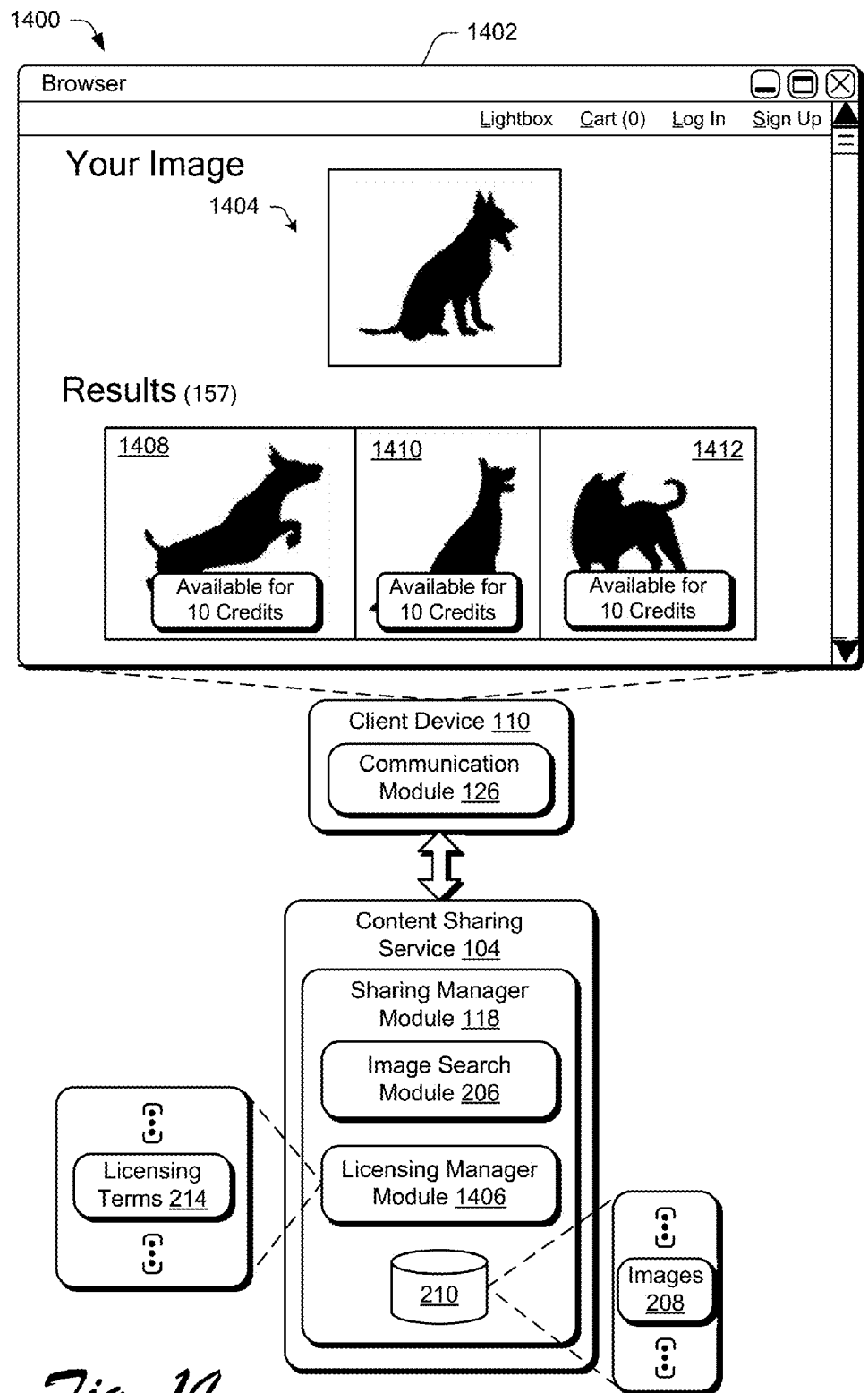
FIG. 14 depicts a system and FIG. 15 depicts a procedure in an example implementation in which an image itself is used as a basis to locate other images available for licensing by a content sharing service.
Figure 15:
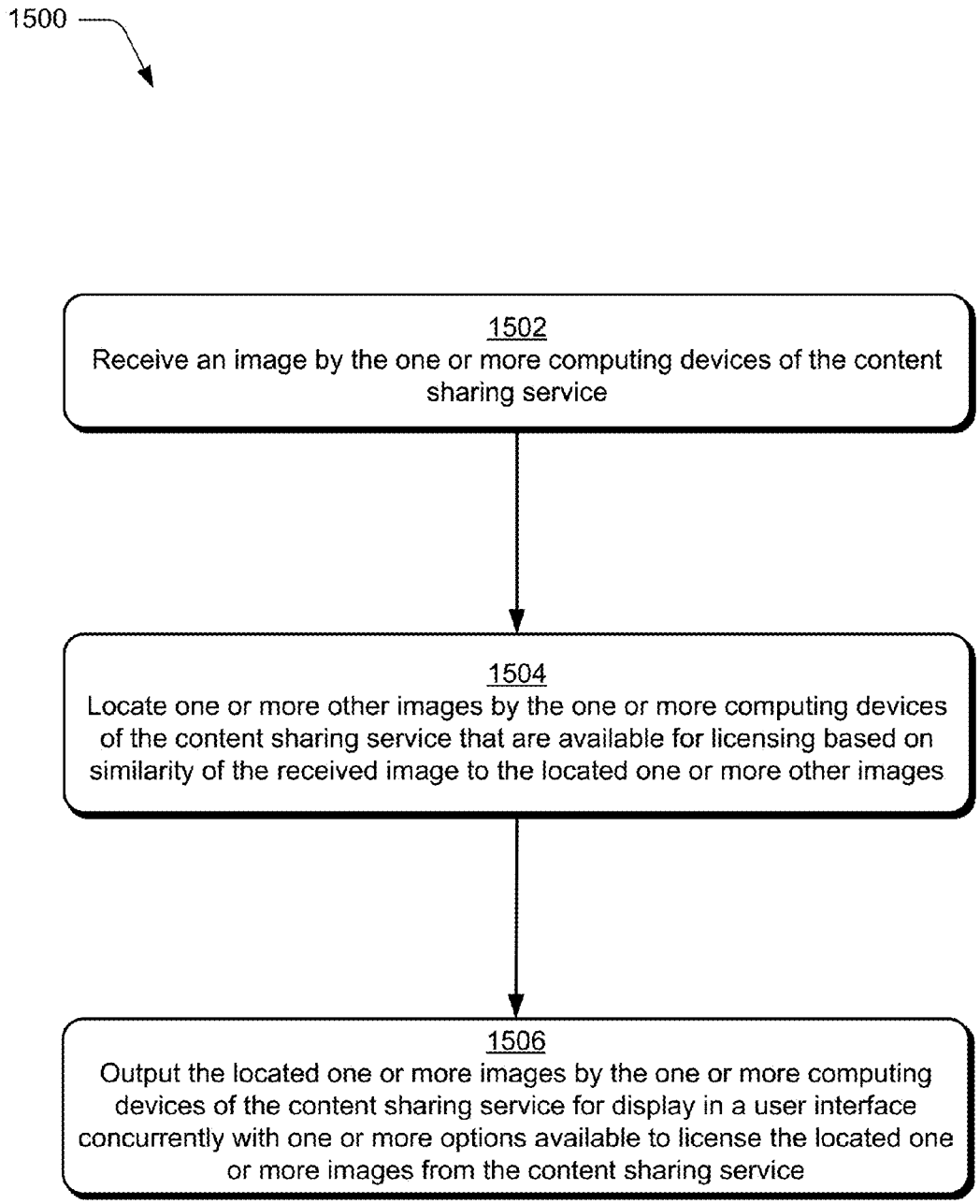

FIG. 14 depicts a system 1400 and FIG. 15 depicts a procedure 1500 in an example implementation in which an image itself is used as a basis to locate other images available for licensing by a content sharing service. Conventionally, image searches of content sharing services are performed using keywords. In some instances, however, a user may obtain an image but be unaware of "where it came from" or who has rights to license the image. Accordingly, a content sharing service in this example is configured to search images based on similarity to a received image to locate images available for licensing.

Accordingly, functionality is included as part of the content creation service to detect watermarks and identify a corresponding content sharing service. The functionality also includes an ability to provide an option to license the image from the identified content sharing service, which may also be performed within a context of the content sharing service and/or involve navigation to the content sharing service. In the following, reference is made interchangeably to FIGS. 14 and 15.

In this example, a content creation professional interacting with client device 110 accesses a content sharing service 104 via a network 112. The communication module 126 of the client device 110 is configured as a browser 1402 that accesses a website of the content sharing service 104.

Via the webpage, the client device 110 uploads an image 1404 to the content sharing service 104 to determine whether a matching image or similar images are available from the content sharing service 104 for licensing. Accordingly, the content sharing service 104 receives an image 1404 (block 1502) and uses the image 1404 to locate one or more other images of the content sharing service 104 that are available for licensing based on similarity of the received image to the located one or more other images (block 1504). The similarities, for instance, may be determined by forming a fingerprint of the received image 1404 and comparing the fingerprint to fingerprints of the images 208 available for licensing from the content sharing service 104. Information associated with the image 1404 may also be used, such as through comparison of metadata, tags, and so forth by the image search module 206.

The image search module 206 may then output results of the search, along with licensing terms 214 as specified by a licensing manager module 1406 of the content sharing service 104. In the illustrated example, a match to the image 1404 is not available but similar images 1408, 1410, 1412 are output in the user interface along with licensing terms 214 of those images. In this way, a user may locate an image available for licensing by using an image found elsewhere without knowing from where that image was obtained, who created the image, and so on.

Although this example described direct interaction between the content creation professional and the content sharing service 104, other examples as described above are also contemplated. For example, these techniques may be incorporated as part of the content sharing service 102 to locate images that are not available for licensing currently from the content sharing service 102, itself. A variety of other examples are also contemplated.

Example System and Device

Figure 16:
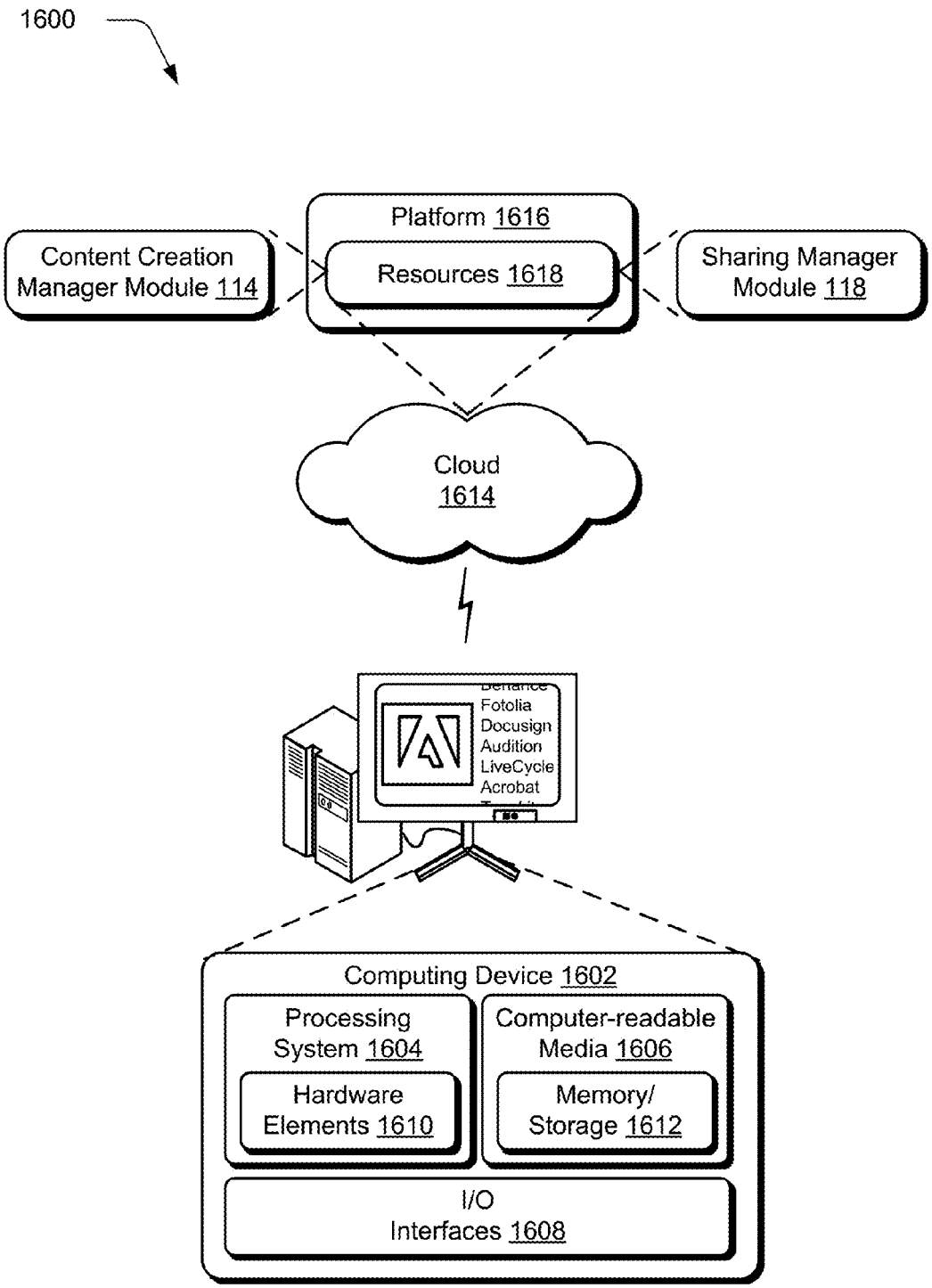
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the content creation manager module 114 and the sharing manager module 118. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment for control of content creation by one or more computing devices of a content creation service, a method comprising:
receiving an image by the one or more computing devices of the content creation service to be used as an exemplar as part of creation of content through interaction with the content creation service;
forming a request by the one or more computing devices to locate an image available for licensing via a content sharing service for use as part of the content based on the image used as the exemplar;
responsive to the location of the image as available for licensing, outputting an option by the one or more computing devices that is selectable to license the image; and responsive to receipt of one or more inputs that select the option, replacing the received image that is used as an exemplar with the licensed image as part of the content.

2. A method as described in claim 1, wherein the received image includes a watermark and the licensed image has the watermark removed.

3. A method as described in claim 1, wherein the receiving, the forming, the outputting, and the replacing are performed without leaving an execution context of the content creation service.

4. A method as described in claim 3, wherein the execution context of the content creation service is not left such that a user interface of the content creation service having functionality usable to create the content remains displayed.

5. A method as described in claim 1, wherein the image used as the exemplar is not received from the content sharing service.

6. A method as described in claim 1, further comprising displaying the received image in an image layer that is displayed concurrently with the content to be created responsive to the receiving of the image by the one or more computing devices.

7. In a digital medium environment for control of content creation by one or more computing devices of a content creation service, a method comprising:
configuring a first version of an item of content created through interaction with the content creation service to include a first preview of a first image that is available for licensing but is not licensed from a content sharing service;
configuring a second version of the item of content created through interaction with the content creation service to include a second preview of a second image that is different than the first image and is available for licensing but is not licensed from the content sharing service;
sharing the first and second versions of the item of content via a network responsive to selection of a sharing option as part of the content creation service; and
outputting an option by the one or more computing devices of the content creation service to license the first or second images from the content sharing service as a replacement of the first or second previews, respectively, for the first or second versions of the item of content that is selected as a result of the sharing.

8. A method as described in claim 7, wherein the sharing indicates one or more terms associated with the licensing of the first and second images, respectively.

9. A method as described in claim 8, wherein the one or more terms include cost.

10. A method as described in claim 7, wherein the first and second previews of the first and second images include a watermark.

11. A method as described in claim 7, further comprising receiving an indication by the content creation service in response to the sharing to select the first or second version of the item of content and wherein the outputting of the option is performed responsive to the receiving of the indication.

12. A method as described in claim 11, wherein the indication of the selection of the first version of the item of the content is formed responsive to a user's interaction with a user interface and further the indication includes one or more annotations regarding the item of content input by the user.

13. A method as described in claim 7, wherein the selection of the first or second versions of the item of content is performed by a user receiving the shared first or second versions of the item of content and wherein the option to license the first or second images is also output to the user receiving the shared first or second versions of the item of content.

14. A method as described in claim 13, further comprising generating a notification to be sent to a user that interacts with the content creation service to create the content, the notification indicating availability of the first or second images for inclusion as part of the item of content and generated responsive to the licensing of the first or second images.

15. A method as described in claim 7, wherein the first and second previews of the first and second images are a low-resolution configuration of the first and second images, respectively.

16. In a digital medium environment for control of content creation by a content creation service, a system comprising:
a content creation manager module implemented at least partially in hardware to expose functionality accessible via a network to create content, the content creation module including:
an image preview module implemented at least partially in hardware to manage inclusion of previews of images that are available for licensing, located through use of an exemplar, for inclusion as part of the content but are not licensed for inclusion as part of the content, the management performed without leaving the exposed functionality of the user interface to create the content; and
an image licensing module implemented at least partially in hardware to output options to license the images for inclusion as part of the content, the output performed without leaving the exposed functionality of the user interface to create the content and to replace the exemplar with at least one said image in response to licensing of the at least one said image.

17. A system as described in claim 16, wherein the image licensing module is configured to replace the previews of the images with the licensed images.

18. A system as described in claim 16, wherein the image preview module is configured to indicate characteristics of licensing of respective said images.

19. A system as described in claim 18, wherein the characteristics include cost, duration of license, or permitted use associated with the license.

20. A system as described in claim 16, wherein the previews include a watermark or are a low-resolution configuration of the respective said images.

* * * * *